(12) United States Patent
Raju et al.

(10) Patent No.: US 8,705,721 B2
(45) Date of Patent: Apr. 22, 2014

(54) SYSTEM AND METHOD OF GENERATING MULTIMEDIA RINGBACK BASED ON DEDUCED USER INTENT

(75) Inventors: Venkatesh Raju, Richardson, TX (US); Steven Nguyen, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1874 days.

(21) Appl. No.: 11/737,476

(22) Filed: Apr. 19, 2007

(65) Prior Publication Data

US 2008/0075236 A1  Mar. 27, 2008

Related U.S. Application Data

(60) Provisional application No. 60/826,632, filed on Sep. 22, 2006.

(51) Int. Cl.
*H04M 1/66* (2006.01)
*H04M 3/42* (2006.01)
*H04M 5/00* (2006.01)

(52) U.S. Cl.
USPC .................. 379/210.02; 455/414.1; 379/257

(58) Field of Classification Search
USPC .................. 379/88.01–88.21, 67.1
See application file for complete search history.

(56) References Cited

U.S. PATENT DOCUMENTS

| 5,390,281 | A | 2/1995 | Luciw et al. |
| 6,545,589 | B1 * | 4/2003 | Fuller et al. .................. 340/7.22 |
| 6,603,844 | B1 * | 8/2003 | Chavez et al. ........... 379/114.13 |
| 2005/0271196 | A1 * | 12/2005 | Florkey et al. ........... 379/210.02 |
| 2006/0173915 | A1 * | 8/2006 | Kliger ........................ 707/104.1 |
| 2007/0150608 | A1 * | 6/2007 | Randall et al. ................ 709/228 |
| 2007/0207782 | A1 * | 9/2007 | Tran ........................... 455/414.1 |
| 2009/0323909 | A1 * | 12/2009 | Timmins .................... 379/88.16 |
| 2010/0027776 | A1 * | 2/2010 | Stifelman et al. ........ 379/207.16 |
| 2012/0076290 | A1 * | 3/2012 | Stifelman et al. ........ 379/207.16 |

OTHER PUBLICATIONS

Raju, Venkatesh, et al., "Multimedia Caller Ring Information Service," Filing Date—Mar. 31, 2006, U.S. Appl. No. 11/395,195.

* cited by examiner

*Primary Examiner* — Fan Tsang
*Assistant Examiner* — Solomon Bezuayehu (57) ABSTRACT

A system for providing ringback content. In the system, a user places a call on a communication device to a callee via a network. The network may store content information about the user and uses this content information to deduce the intent of the user's call. The callee provides ringback content to the user's communication device based on the deduced user call intent.

20 Claims, 5 Drawing Sheets

SYSTEM AND METHOD OF GENERATING MULTIMEDIA RINGBACK BASED ON DEDUCED USER INTENT

CROSS-REFERENCE TO RELATED APPLICATIONS

This application claims priority to U.S. Provisional Patent Application No. 60/826,632, entitled "System and Method of Generating Multimedia Ring Back Based on Deduced User Intent", filed on Sep. 22, 2006, by Venkatesh Raju, et al., which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In general, a party initiating a telephone call may be referred to as the caller. The party receiving the call or to whom the call is placed may be referred to as the callee. The caller and the callee generally make and receive calls on communication devices. When a caller places a call to a callee, the callee communication device rings to alert the callee of the incoming call. The caller generally hears an audible ringing tone on the caller's communication device, known as ringback. The ringback often indicates that the callee's communication device has been alerted of the incoming call.

A ringback service replaces the traditional audible ringing tone heard by the caller when placing a call to a callee. The caller, instead of hearing the traditional audible ringing tone, receives ringback content that is determined by the callee and pushed to the caller. The caller typically receives the ringback content until the callee answers the call or the callee or caller terminates the call session.

SUMMARY

In one embodiment, a system for providing ring back content is provided. The system includes a communication device that is associated with a first user. A network obtains content information related to the first user and uses this content information to deduce the user's call intent. A callee provides ringback content to the communication device based on the deduced user call intent.

In another embodiment, a method of providing multimedia data based on deduced user call intent is provided. The method includes a caller device placing a call to a callee. The method includes accessing content information of a user associated with the caller device responsive to the call being placed. The method includes deducing user call intent based on the content information. The method includes creating ringback related to the content information in response to deducing user call intent, and providing the ringback content to the caller device.

In yet another embodiment, a network server is provided. The network server includes a controller that receives a connection request from a communication device to connect to a callee, and an application, which when executed by the network server, accesses content information associated with the communication device user. The application uses the accessed content information to deduce user call intent and provide ringback content to the communication device based on the deduced user call intent.

These and other features will be more clearly understood from the following detailed description taking in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the embodiments of the present disclosure, an intelligent ringback service is provided that allows a callee to specify the content that will be provided as ringback content. When the caller initiates a telephone call to the callee, the callee accesses a database to determine what, if any, information may have been previously collected about the user. Based on an analysis of the previously collected information, the callee may be able to determine the reason the caller placed the telephone call and deduce the intent of the telephone call. The callee will use the deduced call intent to determine an appropriate ringback content response.

The ringback content may include such exemplary content as video clips, audio clips, advertisements, weather reports, financial reports, sports scores or other types of content that may also include audio portions, video portions, graphical or text portions, combinations of audio, video, graphics or text, and/or other types of media. The category of content information listed herein will now generally be referred to as "multimedia content". The term "video", as used in this disclosure does not necessarily refer only to images displayed at a high enough frame rate to suggest motion but could also refer to static images, that is, images displayed at a lower frame rate such as in a slide show or other types of image displays. Additional information regarding multimedia content being used as ringback may also be found in U.S. patent application Ser. No. 11/395,195 filed on Mar. 31, 2006 entitled, "Multimedia Caller Ring Information Service" (2005.08.015.NS0) (4133.01001) by Venkatesh Raju et al., which is incorporated herein by reference for all purposes.

For purposes of this disclosure, communication devices may include, but are not limited to a mobile handset or other wireless device such as a mobile phone, a personal digital assistant (PDA), a portable computer, such as a laptop, notebook, and/or tablet computers or other wireless devices. Communication devices may also include wireline devices such as IP phone, a session initiation protocol 165 (SIP) phone, computers, and other such devices well known to one of ordinary skill in the art.

Figure 1:
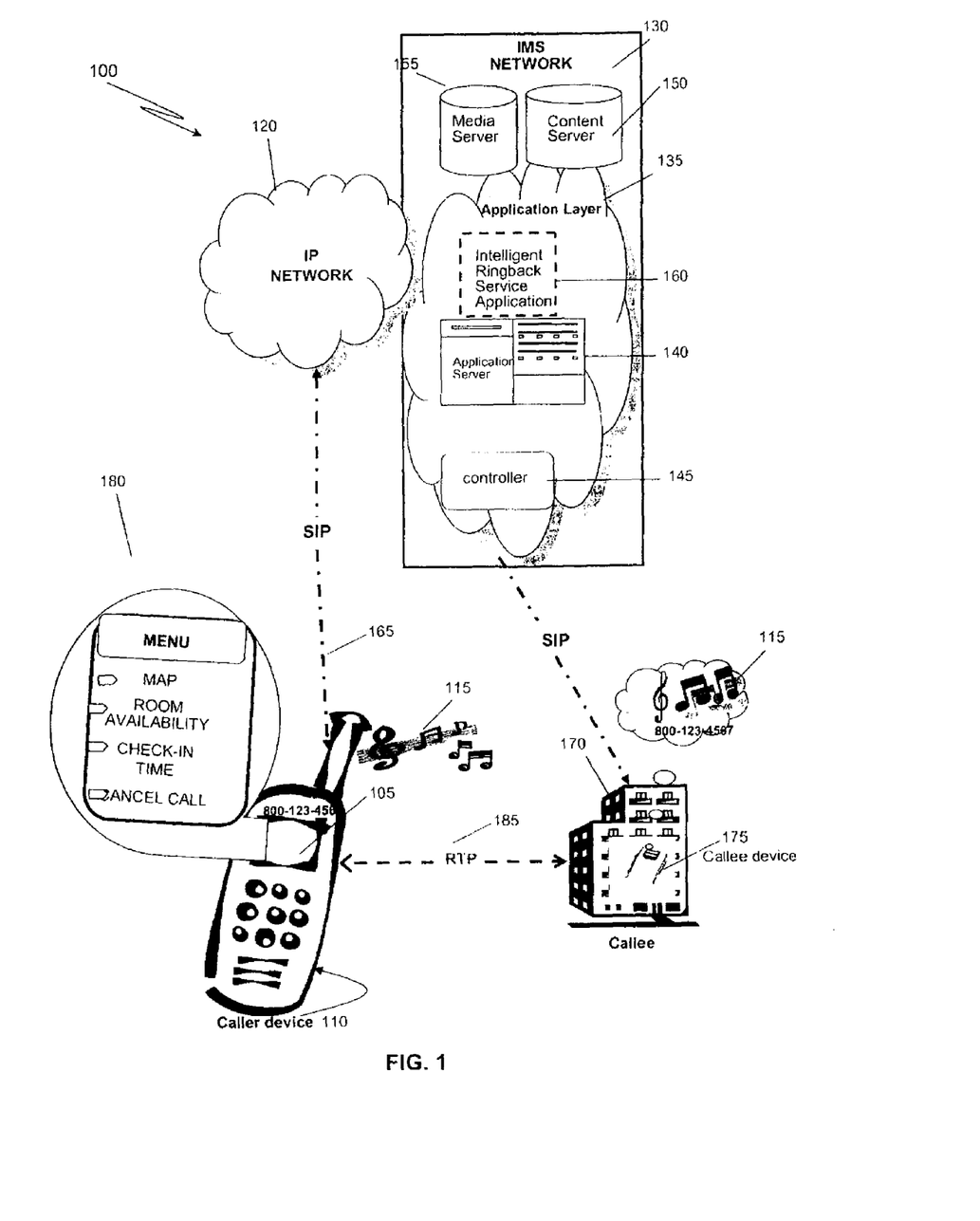
FIG. 1 depicts a system for providing ringback according to one embodiment of the present disclosure.

FIG. 1 illustrates an embodiment of a system 100 for providing ringback content. The system 100 comprises a mobile device 110 that communicates with an IP network 120. It should be recognized, however, that the caller device 110 may be a mobile handset or any other communication device well known to one of ordinary skill in the art. The IP network 120 may be an access network such as a wideband code division multiple access network (WCDMA), a universal mobile telecommunication system network (UMTS), a third generation (3G) wireless access network, or a fourth generation (4G) wireless access network, or other wireless or wired access or other networks known to one of ordinary skill in the art.

As illustrated in FIG. 1, the IP network 120 may communicate with an Internet Protocol (IP) Multimedia Subsystem (IMS) Network Architecture 130. The IMS network 130 is operable for supporting the operation of multimedia services to and from caller communication devices such as the mobile handset 110. The IMS network 130 enables multimedia content to be provided to the mobile handset 110. The structure of the IMS network 130 includes an application layer 135. The application layer 135 includes one or more application servers 140, a controller 145, a content server 150, and a media server 155. In some embodiments, the application servers 140 may include applications including an intelligent ringback service application 160, which is described in further detail later in this disclosure.

The IMS network 130 signals a communication session with a callee 170. The callee 170 may be an actual physical location. For example, the callee 170 may be a hotel, an airline agency, a car rental agency, a bank, a mortgage company, a theater, a privately owned business, a governmental entity, or other such establishments that may be known to one of ordinary skill in the art. The callee generally includes a callee communication device 175 operable to receive and transmit content information to a network or a caller device. In one embodiment, the callee device 175 may be a telephone or other system that communicates over a public telephone switched network (PSTN) or other networks. In another embodiment, the callee device 175 is a computer connected to an internal intranet that communicates using a Voice over Internet Protocol (VoIP). Other embodiments may include different types of callee devices that are known to one of ordinary skill in the art.

In FIG. 1, the mobile handset 110 initiates a call or a connection request to the callee 170 using SIP 165 protocol through the access network 120. Although SIP 165 protocol is shown, other communication protocols, such as Hypertext Transport Protocol (HTTP), Realtime Transport Protocol (RTP), and Realtime Streaming Protocol (RTSP), might be used. When the IMS network 130 receives the connection request, it accesses the content server 150 and obtains content information about the user that is associated with the mobile handset 110. The intelligent ringback service application 160 uses the content information downloaded from the content server 150 to determine or deduce the purpose of the user's call. The intelligent ringback service application 160 resides on an application server 135 of the IMS network 130 and, in some embodiments, may be a subscriber service. A subscriber service may require prior authorization by a telecom provider managing the network for either a callee or caller to access the service. In embodiments of this disclosure, the callee 170 will generally register for the intelligent ringback service application 160 with, for example, the telecom provider. The intelligent ringback service application 160 enables a callee to analyze information that may exist about a user, and based on that analysis, attempt to predict or deduce the reasons for a user's call. This prediction or deduction, allows the callee, in advance of answering a user's call, to provide the needed information to the user as ringback 115.

In one embodiment, the intelligent ringback service relieves the incoming volume of calls that a callee 170 may be required to answer during a given time period. If a caller receives the desired information during ringback, that decreases the need of the callee 170 to answer that caller's call and attention may be directed to other calls or priorities.

Based on the deduced intent of the caller, the callee 170 selects ringback content to be pushed to the caller's mobile device 110. In one embodiment, the ringback content may include a menu 180 that allows a user to select from a variety of different possible reasons for a call. Other embodiments may offer ringback content as a question and answer session that makes an inquiry requiring a response from the caller's mobile device 110, such as via an Interactive Voice Response (IVR) system. Still other embodiments may offer the ringback content as selections from which the user may choose.

The ringback content may be callee dependent and may be related to the callee's type of business establishment. For example, if the callee is a hotel, the ringback content may include user identity, user geographical location, user itinerary, or user online calendar. If the callee is an airline agency, the ringback content may include a flight schedule, gate information, flight arrival time, and/or flight reservation information. If the callee is a car rental agency, the ringback content may include reservation information and/or driving directions.

In one specific illustration, the callee 170 business may be a hotel. A user having just arrived in town may use the mobile device 110, a mobile phone, for example, to call the hotel. The callee 170 upon receiving the connection request executes the intelligent ringback service application 160. The intelligent ringback service application 160 downloads the user's information and tries to determine or predict the reason for the user's call. The caller's information may be downloaded from the content server 150 of the IMS network 130 associated with the callee 170 or may be downloaded from a server that is part of a callee intranet. The downloaded user information may include the caller's identity, online calendar and caller itinerary, such as flight arrival or departure time or any other information about the caller, or caller device 110. Based on the downloaded user information, the intelligent ringback service application 160 may predict that the user is calling about room reservation confirmation. In that case, the callee 170 would push the hotel confirmation information as ringback content. This information may be displayed on a graphical user interface 105 (GUI) that may be on a caller's mobile device.

In an alternative embodiment, the ringback content may be displayed on the mobile device in the form of a menu 180 providing selected ringback content options to the caller based on the predictions deduced of the intelligent ringback service application 160. For example, based on the downloaded user information, the intelligent ringback service application 160 may deduce that a caller may need driving directions to the hotel, confirmation of room availability or confirmation of check-in time. These selection options would then be displayed on the caller's mobile device 110 in the form of a menu 180. The caller may select one or more options from the menu. Alternatively, if none of the menu options meet the caller's needs, then the caller may wait until an operator responds to the call.

In some embodiments, the menu may also include an option to terminate or disconnect the call at ringback. This option may be activated after a caller has received information, regardless of whether or not a caller has received all the information desired. Other embodiments may include an option to extend the ringback so the information provided during ringback may be captured by the caller or so the caller may further review the ringback menu or information. Still, other embodiments may feature an option to talk to an operator or other callee personnel or other options that may be known to one of ordinary skill in the art.

Figure 2:
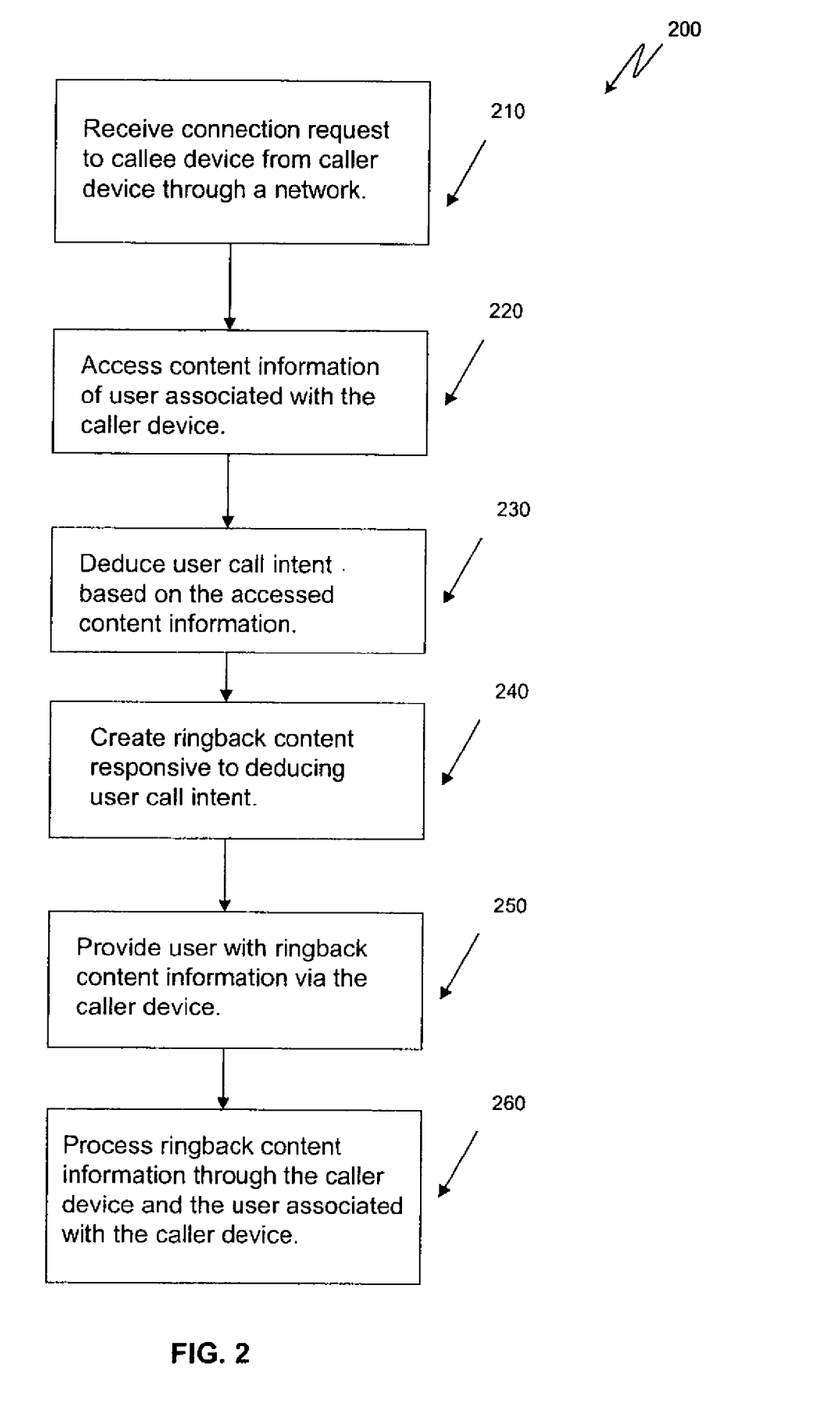
FIG. 2 is a flow diagram of a method according to one embodiment of the present disclosure.

FIG. 2 illustrates a flow diagram of a method according to one embodiment of the present disclosure. Although the method 200 of FIG. 2 is illustrated in serial order, those skilled in the art should understand that the serially illustrated steps may be performed contemporaneously or not necessarily in a particular order. At step 210, a connection request is received from a caller device through an access network to a callee. The connection request is initiated using SIP 165 protocol. The callee accesses content information of a caller associated with the caller device at step 220. The accessed content information may include user information such as flight schedule, personal user online calendar, user geographical location, user itinerary, user identity, and may also include user flight arrival time or user hotel or flight reservations among other types of information. At step 230, based on the accessed content information, the intelligent ringback service attempts to predict or deduce the reason or reasons for the call. Based on the deduced user intent, the callee creates caller ringback content at a step 240. At step 250, the ringback content is formulated and data about the content is delivered to the caller device using SIP 165. The caller device may then retrieve content from the media server and the content server at step 250 using HTTP, RTP, RTSP, or other standard data transport protocols. At step 260, the user interacts with the caller device 110 and processes the ringback content received. In some embodiments, interacting with the ringback content may include the caller determining that additional information is required and signaling the callee to answer the call. In other embodiments, the caller interacting with ringback content may include the caller canceling or terminating the call because the ringback content contains all the information required or desired by the caller.

Figure 3:
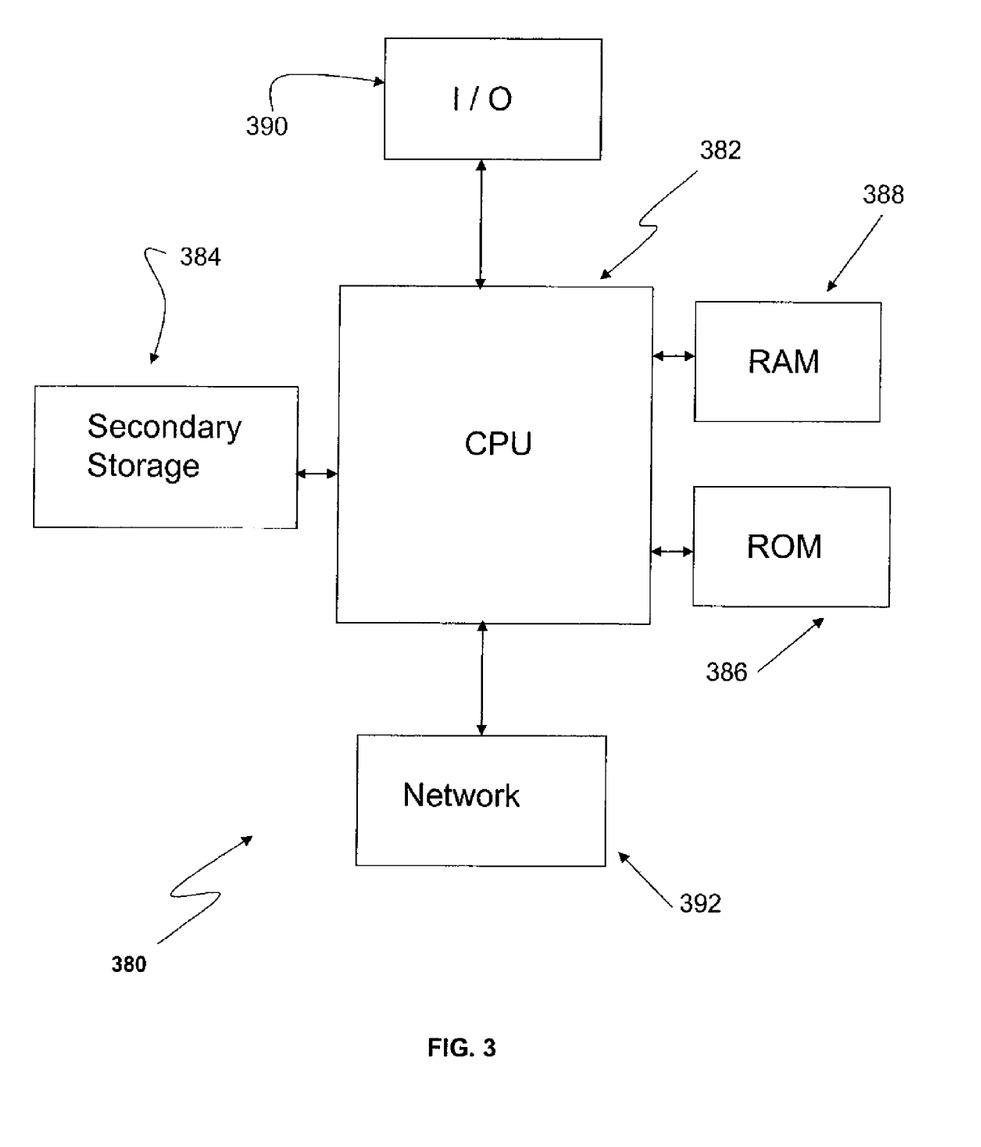
FIG. 3 illustrates an exemplary general purpose computer system suitable for implementing embodiments of the present disclosure.

FIG. 3 illustrates a typical, general-purpose computer system which may be used as the computer or system and is suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 392 devices may enable the processor 782 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. In this disclosure, the processor may execute the intelligent ringback service application 160 illustrated in FIG. 1.

Figure 4:
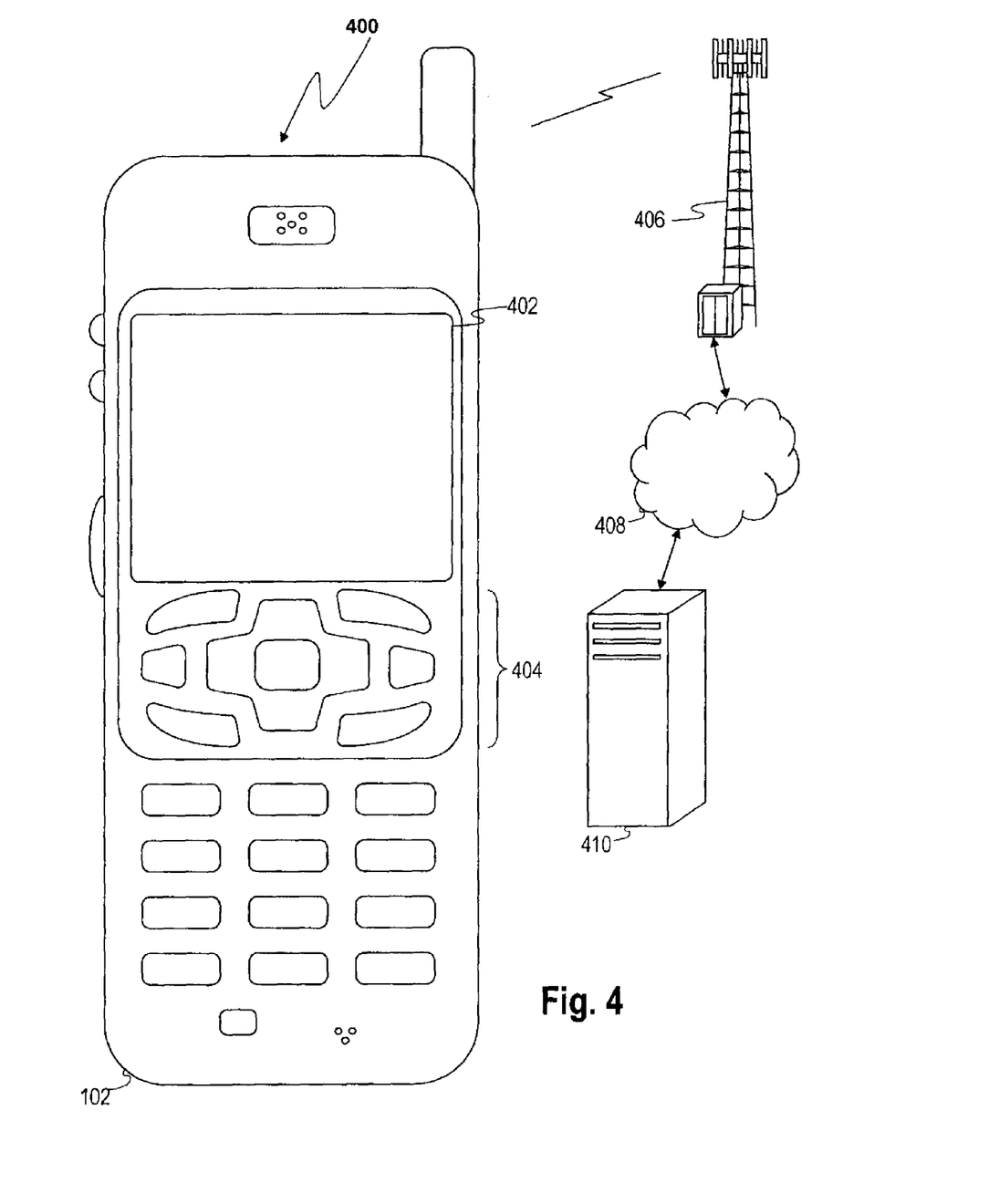
FIG. 4 is a diagram of a wireless communication system including a handset operable for some of the various embodiments of the disclosure.

FIG. 4 shows a wireless communications system 400 including a handset 102. FIG. 4 depicts the handset 102, which may be similar to mobile device 110 and which is operable for implementing aspects of the present disclosure, but the present disclosure should not be limited to these implementations. Though illustrated as a mobile phone, the handset 102 may take various forms including a wireless handset, a pager, a personal digital assistant (PDA), a portable computer, a tablet computer, or a laptop computer. Many suitable handsets combine some or all of these functions. In some embodiments of the present disclosure, the handset 102 is not a general purpose computing device like a portable, laptop or tablet computer, but rather is a special-purpose communications device such as a mobile phone, wireless handset, pager, or PDA.

The handset 102 includes a display 402 and a touch-sensitive surface or keys 404 for input by a user. The handset 102 may present options for the user to select, controls for the user to actuate, and/or cursors or other indicators for the user to direct. The handset 102 may further accept data entry from the user, including numbers to dial or various parameter values for configuring the operation of the handset. The handset 102 may further execute one or more software or firmware applications in response to user commands. These applications may configure the handset 102 to perform various customized functions in response to user interaction.

Among the various applications executable by the handset 102 are a web browser, which enables the display 402 to show a web page. The web page is obtained via wireless communications with a cell tower 406, a wireless network access node, or any other wireless communication network or system. The cell tower 406 (or wireless network access node) is coupled to a wired network 408, such as the Internet. Via the wireless link and the wired network, the handset 102 has access to information on various servers, such as a server 410. The server 410 may provide content that may be shown on the display 402.

Figure 5:
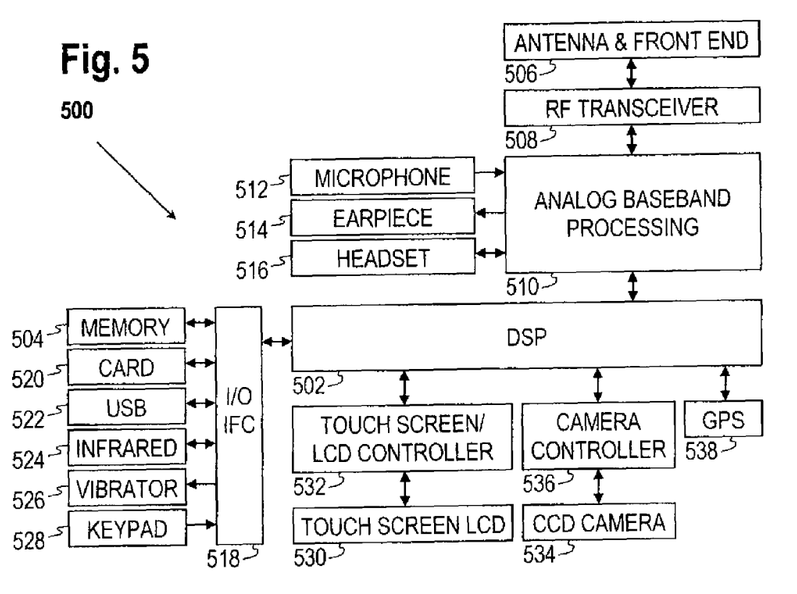
FIG. 5 is a detailed view of the internal circuitry of the handset depicted in FIG. 4.

FIG. 5 shows a block diagram 500 of the handset 102. The handset 102 includes a digital signal processor (DSP) 502 and a memory 504. As shown, the handset 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538.

The DSP 502 or some other form of controller or central processing unit operates to control the various components of the handset 102 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 102 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the handset 102 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the handset 102 to function as a peripheral device to exchange information with a personal computer or other computer system. The infrared port 524 and other optional ports such as a Bluetooth interface or an IEEE 802.11 compliant wireless interface may enable the handset 102 to communicate wirelessly with other nearby handsets and/or wireless base stations.

The input/output interface 518 may further connect the DSP 502 to the vibrator 526 that, when triggered, causes the handset 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 102. Another input mechanism may be the touch screen LCD 530, which may also display text and/or graphics to the user. The touch screen LCD controller 532 couples the DSP 502 to the touch screen LCD 530.

The CCD camera 534 enables the handset 102 to take digital pictures. The DSP 502 communicates with the CCD camera 534 via the camera controller 536. The GPS sensor 538 is coupled to the DSP 502 to decode global positioning system signals, thereby enabling the handset 102 to determine its position. Various other peripherals may also be included to provide additional functions, e.g., radio and television reception.

Figure 6:
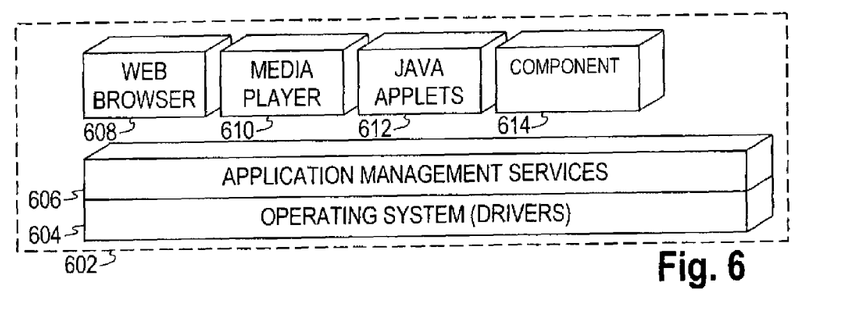
FIG. 6 is a diagram of a software environment that may be implemented on a handset operable for some of the various embodiments of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 102. Also shown in FIG. 6 are a web browser application 608, a media player application 610, and Java applets 612. The web browser application 608 configures the handset 102 to operate as a web browser, allowing a user to enter information into forms and select links to retrieve and view web pages. The media player application 610 configures the handset 102 to retrieve and play audio or audiovisual media. The Java applets 612 configure the handset 102 to provide games, utilities, and other functionality. A component 614 may be a software, firmware, or other system or application that provides capabilities and functionality provided by the mobile device 110 according to embodiments of the present disclosure.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for providing ringback content, comprising:
a communication device associated with a first user;
a network that obtains user content related to the first user and uses the user content information to deduce the user's call intent; and
a callee that provides ringback content to the communication device based on the deduced user call intent;
wherein the network is configured to cancel or connect the user to the callee according to a sufficiency of information provided by the ringback content, the ringback content comprising at least one question to the first user and the sufficiency of information comprising a response provided by the user to the at least one question.

2. The system of claim 1, wherein the callee is an establishment that is one of a hotel, airline agency, car rental agency, bank, mortgage company, theater, privately owned business, and governmental entity.

3. The system of claim 1, wherein if the callee is a hotel, the ringback content includes at least one of a user identity, user geographical location, user itinerary, and user online calendar.

4. The system of claim 1, wherein if the callee is an airline agency, the ringback content includes at least one of a flight schedule, gate information, flight arrival time and flight reservation.

5. The system of claim 1, wherein if the callee is a car rental agency, the ringback content includes at least one of a reservation information and driving directions.

6. The system of claim 1, wherein the network is an IP multimedia subsystem (IMS) network that comprises an application layer that includes one or more application servers, a content server, a media server and a controller.

7. The system of claim 6, wherein the application servers include an application that provides an intelligent ringback service wherein the ringback content is part of the intelligent ringback service.

8. The system of claim 6, wherein the content server stores the user content information about the first user.

9. The system of claim 1, wherein the ringback content comprises media that is one or more of video clips, audio clips, advertisements, reports, graphics, audio portions, video portions, and text.

10. The system of claim 1, wherein the communication device includes a graphical user interface (GUI) that displays the ringback content as a menu comprising a plurality of options selectable by the user.

11. A method of providing ringback based on deducing user call intent, the method comprising:
a caller device placing a call to a callee;
accessing content information related to a user associated with the caller device responsive to the call being placed;
deducing user call intent based on the content information;
creating ringback content related to the content information in response to deducing user call intent;
providing the ringback content to the caller device; and
canceling or connecting the user to the callee according to a sufficiency of information provided by the ringback content, the ringback content comprising at least one question to the first user and the sufficiency of information comprising a response provided by the user to the at least one question.

12. The method of claim 11, wherein the content information comprises media that is one or more of video clips, audio clips, advertisements, reports, graphics, audio portions, video portions, and text.

13. The method of claim 11, wherein the call is made using a SIP communication standard.

14. The method of claim 11, wherein the call is placed via an IP multimedia subsystem (IMS) network comprising an application layer that includes one or more application servers, a content server, a media server and a controller.

15. The method of claim 14, wherein the content server stores the content information about the caller.

16. The method of claim 14, wherein the application servers include an application that provides an intelligent ringback service which when executed by the server provides the content information as ringback content to the caller device.

17. The method of claim 11, further comprising:
determining via a user selection whether the user requires additional information;
canceling the call if no additional information is required by the user; and
connecting the callee if additional information is required by the user.

18. The method of claim 11, wherein the callee is an establishment that is one of a hotel, airline agency, car rental agency, bank, mortgage company, theater, privately owned business, and governmental entity.

19. A network server comprising:
a controller that receives a connection request from a communication device to connect to a callee; and
an application which when executed by the network server accesses content information associated with a communication device user and the callee, the application using accessed content information to deduce user call intent and provide ringback content to the communication device based on the deduced user call intent, the application configured to cancel or connect the user to the callee according to a sufficiency of information provided by the ringback content, the ringback content comprising at least one question to the first user and the sufficiency of information comprising a response provided by the user to the at least one question.

20. The network server of claim 19, wherein the accessed content information comprises media that is one or more of video clips, audio clips, advertisements, reports, graphics, audio portions, video portions, and text.

* * * * *